March 5, 1968     I. O. MINER     3,371,553

STOP FOR VALVE OPERATOR

Filed June 15, 1966

INVENTOR.
IRVING O. MINER
BY
Barlow & Barlow
ATTORNEYS

United States Patent Office 3,371,553
Patented Mar. 5, 1968

3,371,553
STOP FOR VALVE OPERATOR
Irving O. Miner, Warwick, R.I., assignor to The New York Air Brake Company, a corporation of New Jersey
Filed June 15, 1966, Ser. No. 557,754
5 Claims. (Cl. 74—526)

ABSTRACT OF THE DISCLOSURE

A power operated piston has a yoke mounted on the piston rod and a pair of guide rods received into the cylinder head. The yoke slidably reciprocates along the guide rods. A link pivotally attached to the yoke and an arm rotatably operates a valve shaft. Stop means are provided on the guide rods to limit movement of the valve shaft.

---

This invention relates to a valve operator of the power type which swings the valve from open to closed position or vice versa.

In the mechanical operation of a butterfly valve, for example, there is a tendency for the swinging valve to overtravel either end in moving to open or closed position, and some stops are often desired to limit the movement of the valve so that when it arrives at its correct open or closed position, it will be prevented from further movement.

A valve operator which is in accordance with the present invention comprises a cylinder with a piston therein which is movable in and out by some sort of fluid pressure. A piston rod extends through one of the heads of the cylinder and is connected by a clevis to an operating arm attached to the shaft which swings the valve disc of the valve. The cylinder is movably mounted so that it can rock as the parts connected thereto are moved from one position to another. In order to provide the stop, a yoke is mounted on the clevis or secured in some way to the piston rod so that it may provide an abutment in a balanced relation with reference to the movement of the piston rod and the valve disc shaft arm which it operates. One or more abutments may be carried either by the yoke or may be carried by the head of the cylinder in spaced relation so that when the parts engage, they will engage in a balanced relation and not put any strain on the parts. In one form of the invention rods are secured to the cylinder head and extend through the yoke in spaced relation, that is, one on either side of the piston rod, and these rods are equipped with stops which are adjustable along the rods on either side of the yoke so that the yoke may engage these stops for limiting its movement in one direction or the other. In other cases the abutment may be carried by the yoke and will engage directly with some portion of the cylinder head to form a stop in one direction.

An object of the invention is to provide a stop for the limiting of the movement of the shaft of the valve disc so that it will come to rest in the right position, such stop being so arranged that regardless of its position of adjustment, it will be in balanced relation and put no strain upon any of the parts which go to operate the valve.

Another object of the invention is the arrangement so that the parts which carry the stops will be placed in tension or compression only without imposing any side loads on the stops.

Another object of the invention is to provide stops which may be used for one direction only or entirely removed should they not be required and thus provide a simpler mechanism.

With these and other objects in view, the invention consists of certain novel features of construction as will be more fully described and particularly pointed out in the appended claims.

With reference to the drawings, 10 designates a shaft extending from a valve which it is desired shall be rotated to move the fluid control from open to closed position or vice versa.

Figure 1:
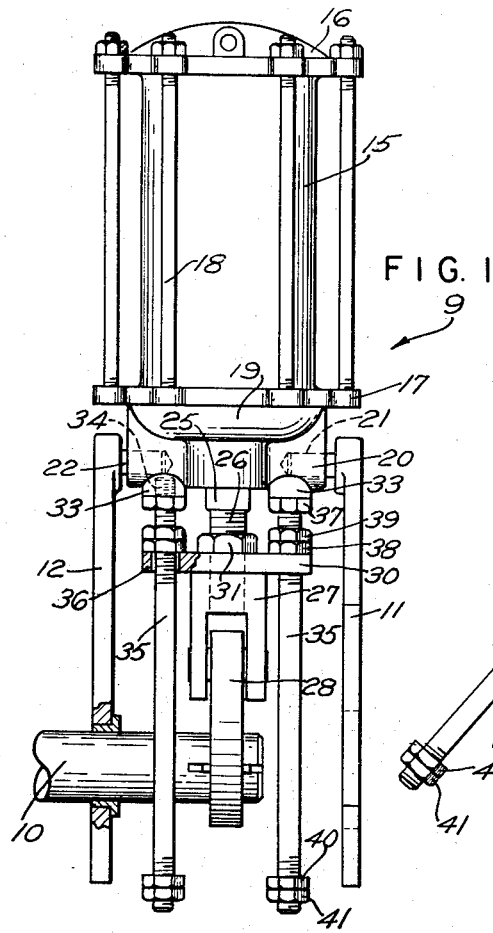
FIG. 1 is an elevation of the valve operator with stops for limiting the movement of the operator in both directions.
Figure 2:
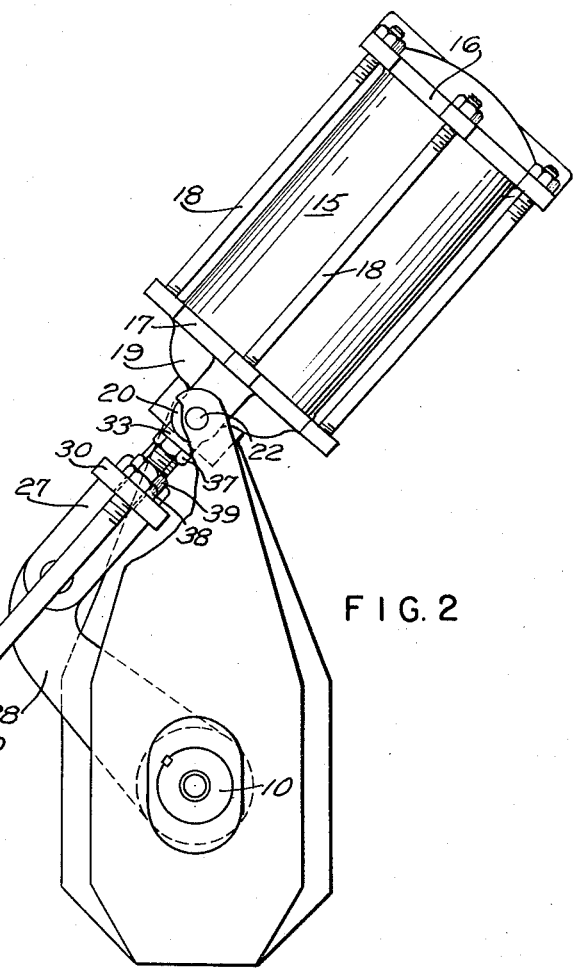
FIG. 2 is an elevation at right angles to that shown in FIG. 1.

The operator designated generally 9 comprises supporting brackets 11 and 12 with the shaft 10 extending through the bracket 12 as shown in FIG. 1. A cylinder 15 is supported by this bracket which cylinder has an upper head 16 and a lower head 17, these heads being held onto the cylinder 15 by bolts 18. The lower cylinder head is thickened as at 19 and provided with projections 20 which have bores 21 therein for the reception of studs 22 which pivotally mount the cylinder on the supporting brackets 11 and 12. A piston rod 25 threaded as at 26 extends downwardly through the lower cylinder head and receives a clevis 27 which is pivotally attached to the arm 28 extending from and keyed to the shaft 10 as an operator therefor.

A yoke 30 extends across the top of the clevis 27 and is secured in position by a nut 31 which also acts as a check nut to hold the clevis in its adjusted position upon the threaded portion 26 of piston rod 25.

On opposite sides of the rod 25 bosses 33 are provided which have flat surfaces and are bored as at 34 for the reception of the threaded ends of rods 35 which extend loosely through openings 36 in the yoke 30. These rods are held in their position in the bosses 33 by check nuts 37, while stop nuts 38 and checks 39 are provided at suitable locations along the threaded surface of the rods 35 for engagement with the yoke 30 to limit the upward movement of the piston and piston rod in the cylinder. Other stop nuts 40 with check nuts 41 are provided at the lower end along the threaded rods 35 so as to be engaged by the yoke 30 and limit the movement of the piston rod in the opposite or downward direction. Thus, stops are provided for the limiting of the movement of the piston rod in both directions.

Figure 3:
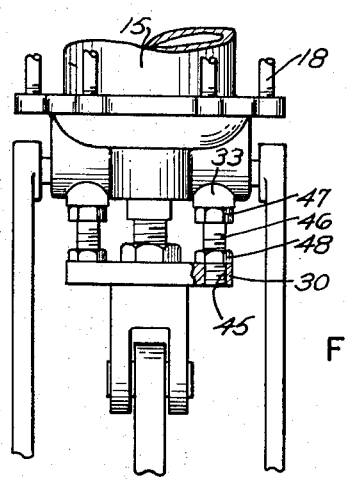
FIG. 3 is a modified form showing the arrangement when the stop is needed in only one direction.

In some cases where a stop is required only in one direction such, for example, as a movement of the piston rod upwardly in the cylinder 15, I have provided an arrangement as shown in FIG. 3. Here the yoke 30 has threaded openings as at 45 and studs 46 are threaded into these openings and provided with heads 47 to engage the flat surface of the bosses 33 being held in the desired position by the check nuts 48 engaging the upper surface of the yoke 30. By this arrangement the heads 47 of the studs will engage the bosses 33 and provide a limit for the upward movement of the piston when this is the only direction in which a stop is required.

I claim:
1. In a valve operator, a cylinder, first abutment means carried by said cylinder, a piston rod extending from the cylinder, a shaft secured to a valve for operating a part thereof, means secured to the piston rod and said shaft for operating said shaft as the piston rod reciprocates, a yoke carried by said piston rod, and second abutment means carried by the yoke to engage the first abutment means and limit the movement of the piston rod and valve shaft connected thereto, said first and second abutment means comprise spaced parts located on opposite sides of the piston rod in symmetrical relation.

2. In a valve operator as in claim 1 wherein said first abutment means comprises a rod secured to said cylinder and loosely passing through said yoke, said yoke reciprocating along said rod, and stops carried by said rod with which said yoke engages to limit the movement of the piston rod.

3. In a valve operator as in claim 1 wherein said first abutment means comprises a rod secured to said cylinder and loosely passing through said yoke, said yoke reciprocating along said rod, and stops carried by said rod and located on opposite sides of the yoke with which stops said yoke engages to limit the movement of the piston rod in both directions.

4. In a valve operator as in claim 1 wherein said second abutment means comprises a stud carried by said yoke.

5. In a valve operator as in claim 1 wherein said second abutment means comprises a stud threaded into said yoke to be adjusted relative thereto.

References Cited
UNITED STATES PATENTS 1,737,433   6/1926   Rowntree _____ 92—13

FRED C. MATTERN, Jr., *Primary Examiner.*

J. S. CORNETTE, *Assistant Examiner.*